United States Patent
Pollard et al.

(10) Patent No.: US 7,619,664 B2
(45) Date of Patent: Nov. 17, 2009

(54) DIGITAL IMAGE CAPTURE APPARATUS AND METHOD FOR OBTAINING A DIGITAL IMAGE OF AN OBJECT

(75) Inventors: Stephen B. Pollard, Gloucestershire (GB); Maurizio Pilu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 581 days.

(21) Appl. No.: 11/248,156

(22) Filed: Oct. 13, 2005

(65) Prior Publication Data

US 2006/0033835 A1 Feb. 16, 2006

Related U.S. Application Data

(62) Division of application No. 10/075,300, filed on Feb. 15, 2002, now abandoned.

(30) Foreign Application Priority Data

Feb. 16, 2001 (GB) .................................. 0103828

(51) Int. Cl.
- *H04N 5/217* (2006.01)
- *H04N 5/222* (2006.01)
- *H04N 1/387* (2006.01)
- *G06K 9/40* (2006.01)

(52) U.S. Cl. .................. 348/241; 348/371; 382/275; 358/450

(58) Field of Classification Search .............. 348/77, 348/78, 239, 241, 246, 370, 371; 382/117, 382/264, 274, 275; 358/450, 475, 509; 351/207
See application file for complete search history.

(56) References Cited

U.S. PATENT DOCUMENTS

| | | | |
|---|---|---|---|
| 4,814,630 A | 3/1989 | Lim | |
| 4,926,058 A | 5/1990 | Iwamoto et al. | |
| 5,296,937 A * | 3/1994 | Nakatani et al. | 358/448 |
| 5,969,372 A | 10/1999 | Stavely et al. | |
| 6,021,210 A | 2/2000 | Camus et al. | |
| 6,061,092 A * | 5/2000 | Bakhle et al. | 348/243 |
| 6,088,612 A | 7/2000 | Blair | |
| 6,211,913 B1 * | 4/2001 | Hansen et al. | 348/218.1 |
| 6,278,490 B1 * | 8/2001 | Fukuda et al. | 348/362 |
| 6,714,665 B1 * | 3/2004 | Hanna et al. | 382/117 |
| 6,744,471 B1 * | 6/2004 | Kakinuma et al. | 348/371 |
| 6,965,460 B1 * | 11/2005 | Gann et al. | 358/471 |
| 6,975,360 B2 * | 12/2005 | Slatter | 348/370 |
| 7,136,537 B2 * | 11/2006 | Pilu et al. | 382/274 |
| 2001/0002850 A1 * | 6/2001 | Slatter | 348/370 |

FOREIGN PATENT DOCUMENTS

| | | |
|---|---|---|
| EP | 0930498 | 7/1999 |
| GB | 2356996 | 6/2001 |
| GB | 2358099 | 7/2001 |
| JP | 11252451 A * | 9/1999 |
| WO | WO 01/28226 | 4/2001 |

* cited by examiner

*Primary Examiner*—John M Villecco

(57) ABSTRACT

A digital image capture apparatus is provided which is arranged to capture at least two images of a document and combine the images to produce a final image in which the effects of specular reflection and/or ambient light are removed. The apparatus includes a light source and a first image is captured with the source illuminating the document. A second ambient image is captured with the light source switched off, and the images are combined either by subtracting the ambient image from the first image or by replacing areas of the first image by corresponding areas of the ambient image.

11 Claims, 6 Drawing Sheets

Figure 1:
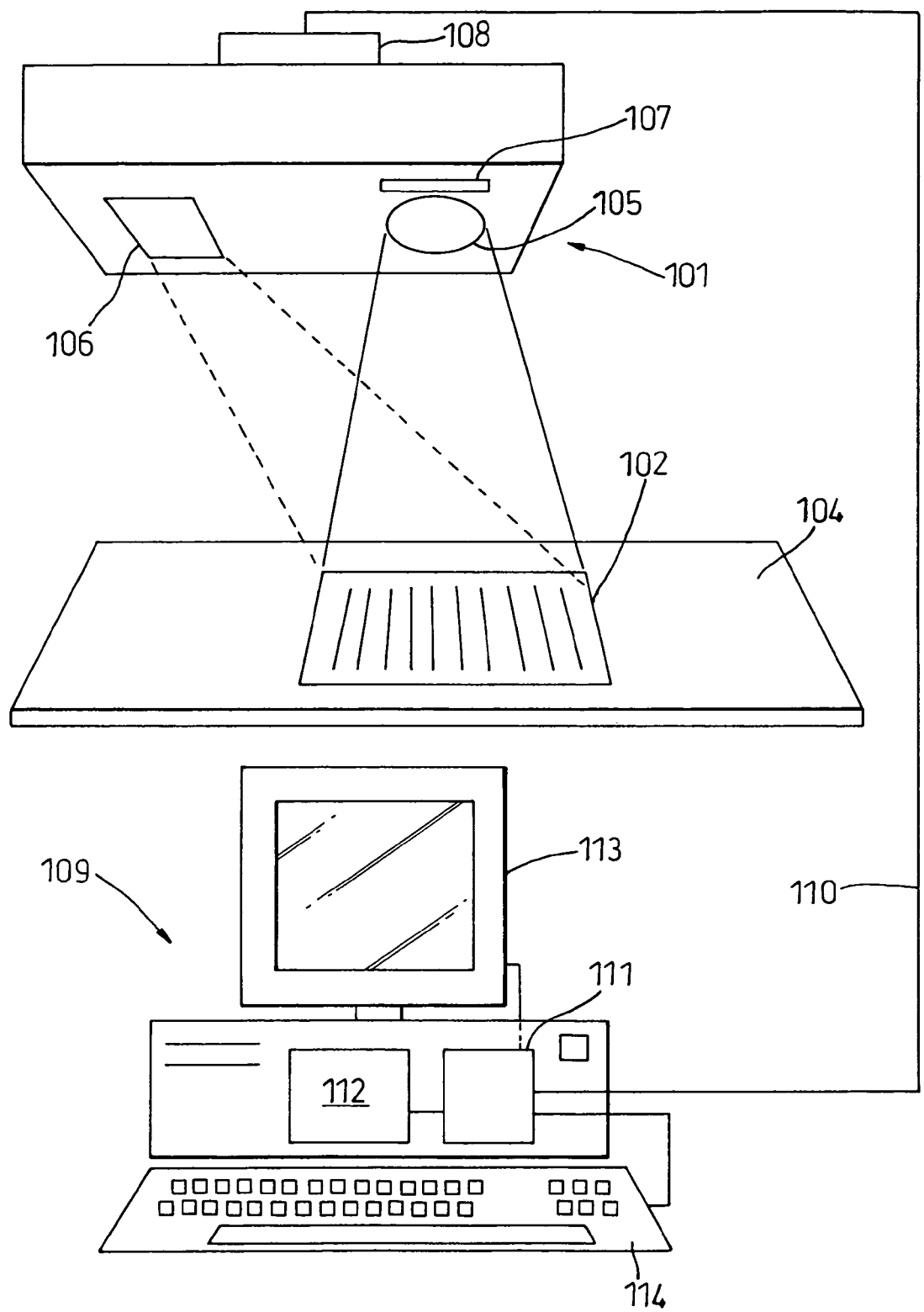

DIGITAL IMAGE CAPTURE APPARATUS AND METHOD FOR OBTAINING A DIGITAL IMAGE OF AN OBJECT

This invention relates to the field of digital cameras. It in particular, but not exclusively relates to a digital image capture apparatus which is configured to obtain an electronic image of a document which is largely free of the effects of specular reflection.

The most widely used devices at present for capturing an electronic image of a document are flat-bed and sheet feed scanners. Whilst these devices have proved extremely robust they do suffer from several disadvantages in some circumstances. For instance, flat-bed scanners occupy a significant area of desk space whilst sheet feed devices are limited to operation with documents of limited size and thickness.

An alternative device which can be employed for document capture is the digital camera. Digital cameras are well known in the art and in their simplest form comprise a detector and a lens assembly. The detector most commonly comprises an array of light sensitive elements. An example is the charge coupled device (CCD) array. The lens assembly is adapted to direct light from within a predetermined field of view onto the detector.

In use, a document is placed within the field of view of the camera and at a distance such that it properly focused onto the lens. This can be assured by supporting the camera on a fixed stand over an area of desk space onto which document is placed. The lens produces an image of the document on the detector. This image is converted into a digital image, with the value of each point or pixel in the image corresponding to the output of a corresponding node of the array.

The digital camera also typically includes a read-out circuit which interrogates each of the nodes of the array. The read-out circuit may serve as a digital shutter to control the exposure of each image. The output of the read-out circuit is stored in a memory integrated into the camera or is fed through a remote link to a computer or the like. To ensure that a controlled and even illumination of the original document is obtained a flash light is typically incorporated into the camera. The flash light illuminates the original document with white light during image capture. By choosing a high intensity flash light and a correspondingly high shutter speed it is possible to swamp the majority of light produced by unwanted ambient light sources.

A simple camera of this design has many limitations. Firstly, the image that is captured will typically include areas of the document which are obscured by the phenomena of specular reflection. Typically, many documents consist of glossy material or semi-glossy material. When the flashlight is illuminated high energy specular reflected light is incident upon the light sensitive nodes which swamps the lower level diffuse light corresponding to the image content of the document. Also, some specular reflection may be caused by ambient light incident upon the document.

Several solutions to the problem of specular reflection within an image have been proposed in the prior art. The simplest of these solutions is to move the flash light out of the field of view of the camera lens.

Unfortunately, this increases the size of the camera as the distance from the lens to the flash light must be increased compared with a system in which the light source lies within the field of view.

The use of an obliquely positioned light source also produces an uneven illumination of the document which is undesirable and requires carefully tailored (and expensive) reflector designs.

An alternative solution has been proposed in which two light sources are provided on the camera positioned on a circle diametrically opposite one another with the lens in the centre of the circle. A first image is captured with the document illuminated by the first source only. A second image is then captured using only light from the second source. The two images are then combined to remove specular reflection caused by each light source.

Whilst this second technique is reasonably effective in removing specular reflection there may still be glare spots caused by uncontrolled ambient light. This can only be prevented by operating the system in an area of low ambient light levels.

It is an object of this invention to provide a digital image capture apparatus which is suitable for use in a variety of operating conditions.

In accordance with a first aspect the invention provides a digital image capture apparatus configured to capture an image of a document at least partially illuminated by ambient light, the apparatus comprising:

an image capture means comprising a detector adapted to capture an image of the document;

illumination means for illuminating the document, a detector read-out means for capturing image data from the detector in response to a control signal;

control means for controlling the detector read-out means and the illumination means, in which the control means provides a first control signal to the read-out means to capture a first image of the document when illuminated by the illumination means at a first intensity and the ambient light to produce a first image, and in which the control means further provides a second control signal to the read-out means to capture a second image of the document when the document is illuminated by the illumination means at a second, lower, intensity and the ambient light; and processing means adapted to process the first captured image with the second captured image to produce a final image of the document.

The second lower intensity level of the illumination means preferably comprises zero or substantially zero intensity of the illumination means. In this case, the second image is captured using only ambient illumination.

The apparatus therefore combines the data obtained from two captured images together to produce a final image of the document. One of the images is captured with the document illuminated by the camera together with ambient light. The other is captured under ambient light with a smaller amount of illumination from the illumination means. By ambient light, we may mean sunlight, ceiling lights and/or task lights which illuminate the document.

The read-out circuit may be adapted to capture first and second images from the detector at substantially the same exposure, and the processing means may be adapted to combine the two captured images to form a final image by subtracting the data forming the second image from the data forming the first image. This will remove the ambient light contribution from the first captured image. This is advantageous over prior art systems which have chosen to use a very fast exposure in attempts to make the final image insensitive to the contribution of ambient light.

In many cases, the captured images may contain noise. A common source of such noise is the detectors themselves which may suffer from KTC noise. To combine two images which contain noise by subtracting the captured data will have the effect of doubling the noise levels in the final image. In extreme case this may have a noticeable effect on the quality of the final image.

It is therefore proposed that the processing means may be configured to pass one or both of the captured images through a low pass filter prior to subtraction. The high frequency noise can be removed by such a filter to leave a higher quality final image.

The filter may smooth the or each captured image in the spatial or frequency domain.

It is most preferred that only the second captured image corresponding to the ambient light is low-pass filtered.

Conveniently, the illumination means may comprise one or more sources of light which are located outside of the field of view of the detector. A suitable source is a white flash bulb such as is commonly used on digital cameras. A lens may be provided in order to control the field of view. With this arrangement the illumination means will not produce any glare spots in the final image due to specular reflection of light onto the detector. However, glare spots may be produced due to ambient light which reflects onto the detector. As the source of ambient light cannot be controlled this can not be avoided. By subtracting the second image from the first image these specular reflections can be substantially removed from the final image.

In some applications, however, it may be preferred that the illumination means comprises at least one source of light that is located within the field of view of the detector. In this case, subtracting the second image from the first image can be used to remove the contribution to glare made by ambient light (and also the background effect of ambient light) but will not remove the glare produced by the illumination means.

To deal with such a problem, the control means may provide the second control signal to the read-out means to capture the second image of the document when illuminated by the ambient light substantially without any illumination from the illumination means and with a longer exposure than the first captured image, the processing means including identifying means for identifying areas or points in the first captured image that correspond to glare spots and replacement means configured to replace those parts of the first image identified as glare spots with corresponding parts taken from the second image.

In effect, areas of glare are pasted over by the corresponding areas of the second image which are captured under ambient light.

It will of course be appreciated that the apparatus may capture two ambient images-one at the same exposure as the first image and another at the longer exposure which is preferably a full exposure. By full exposure we mean that the captured image is neither under or over exposed.

Therefore in a refinement the control means may:

provide a third control signal to the read-out means to capture a third image of the document when the document is illuminated by the ambient light without being illuminated by the illumination means, the third image having a longer exposure than the first image; and in which the processing means is arranged to combine the three captured images to form a final image, the processing means including combining means arranged to subtract the second image from the first image to form a processed first captured image, identifying means for identifying areas or points in the processed first captured image that correspond to glare spots, and replacement means for replacing those points with values dependent upon the data at corresponding points in the third image.

Preferably the first and second images are produced using substantially the same exposure whilst the third image is produced at a different, longer, exposure. Conveniently, the exposure for the first and the third images is selected to provide a substantially full exposure of the captured image.

The technique of pasting in areas of the fully exposed ambient image is most successful in cases where the colour temperature of the illumination means and the ambient light are the same. If the colour temperatures differ there will be a noticeable mismatch in the final image.

The processing means may pre-process the third image prior to combining with the other images to compensate for differences in colour temperature and/or the exposure and/or distribution of light between the ambient light and the illumination means.

The processing means may compute a transformation that maps the colour intensity data for the ambient image onto the first image. This mapping enables variations in colour temperature across the image to be compensated. Of course, this will require a detector which is configured to produce colour output data, typically having an array of nodes sensitive to red, green and blue light.

Suitable transforms include 3×3 or 3×4 colour matrix (computed using a least squares method between corresponding pixels in the first and the third images. Most preferably, the colour compensation is performed after the second image has been subtracted from the first image.

In areas of specular reflection extreme variations in colour temperature may be present. The processing means may therefore determine the colour transform for areas of specular reflection using data obtained from one or more regions immediately surrounding the specular data.

The matching can be further enhanced by blending together the edges of areas of the final image which have been replaced by data from the third image. A blending region may be defined around each replaced area or point which radiates away from each identified point in the first image which corresponds to a specular reflection. In the blend region, the data from the first and third images may be blended by amounts varying from 100 percent third image to 100 percent first image moving away from the specular point. The blend may vary linearly with distance across the blend region.

To ensure that the ambient light conditions present during the capture of the first and the second (or third) images remain constant a high shutter speed should be selected and the time gap between the capture of images should be as short as possible. The time gap is typically dependent upon the speed at which the image data can be read from the detector. Modern devices require around 0.1 seconds to capture each image. This delay can in some cases cause a spatial mismatch between the images if the detector moves relative to the document between images.

To allow for some movement of the detector the processing means may be adapted to spatially match the captured images by identifying similar features in each image and producing a mapping transform which ensures that areas of each image that correspond to identical features are combined.

The apparatus may conveniently include a shield which is provided around at least part of the illumination means which substantially prevents ambient light from striking the document from the location of the illumination means.

By providing the shield it is possible to ensure that any specular reflection due to the illumination means occupies a different part of the captured image from specular reflection caused by ambient light.

In some cases the ambient light may be insufficient to allow a fully exposed ambient image to be captured. In this case, there will be no data available to paste into the first image to remove specular reflections when the illumination means lies within the field of view of the detector.

In an alternative arrangement for removing glare produced by the first illumination means, the apparatus may conveniently include a second illumination means for illuminating the document, and in which the control means provides a first control signal to the read-out means to capture a first image of the document when illuminated by the first illumination means and the ambient light but not the second illumination means to produce a first image, provide an additional control signal to the read-out means to capture an additional image of the document when the document is illuminated by the second illumination means and the ambient light substantially without being illuminated by the first illumination means; and processing means adapted to process the first captured image with the additional captured image to produce a final image of the document.

The combination of the images can be performed in a number of ways. However, the simplest is to produce a final image in which the value of each data point in the final image is the minimum value of the corresponding point in the first and additional images. This is possible since it is known that glare points will take a higher than normal value (possibly even saturating the detector).

The first illumination means and the additional illumination means may respectively comprise flash lights. They may be supported in a fixed position relative to the detector.

It is also envisaged that at least one further ambient image may be captured (taken in ambient light) at the same exposure as the first and/or additional images captured with the first and second illumination means, the or each additional image being subtracted from the respective first image or additional image prior to producing the final image of the document.

The apparatus may further include a stand which is adapted to support the camera above a worksurface or the like.

The processing means may form an integral part of the camera. Alternatively, the camera may be connected to a computer which forms the processing means.

The image capture means may comprise a digital camera. The illumination means may form a part of the camera or it may be located remotely to the camera. For example, the camera may be supported by a stand which also supports the illumination means.

The camera may include a housing and the processing means may be located within the housing to form a part of the camera.

In accordance with a second aspect the invention provides a method of capturing an image of a document at least partially illuminated by ambient light, the method comprising the steps of:
providing a controllable light source;
capturing a first image of the document with the light source illuminating the document at a first intensity;
capturing a second image of the document when illuminated by the light source at a second, low, intensity; and processing the first captured image with the second captured image to produce a final image of the document.

Preferably, the second, lower, intensity comprises zero intensity such that the second image is captured with the light source switch off or pointed away from the document.

The first and second images may be captured with the same exposure and the step of processing may comprise subtracting the second image from the first image.

Alternatively, the first and second images may be captured at different exposures such that both images are correctly exposed and with the intensity of the light source during capture of the second image substantially zero. In this case the step of processing the images may comprise identifying areas or points in the first image that correspond to glare spots and replacing those points with values dependent upon the data at corresponding points in the second image.

Figure 2:
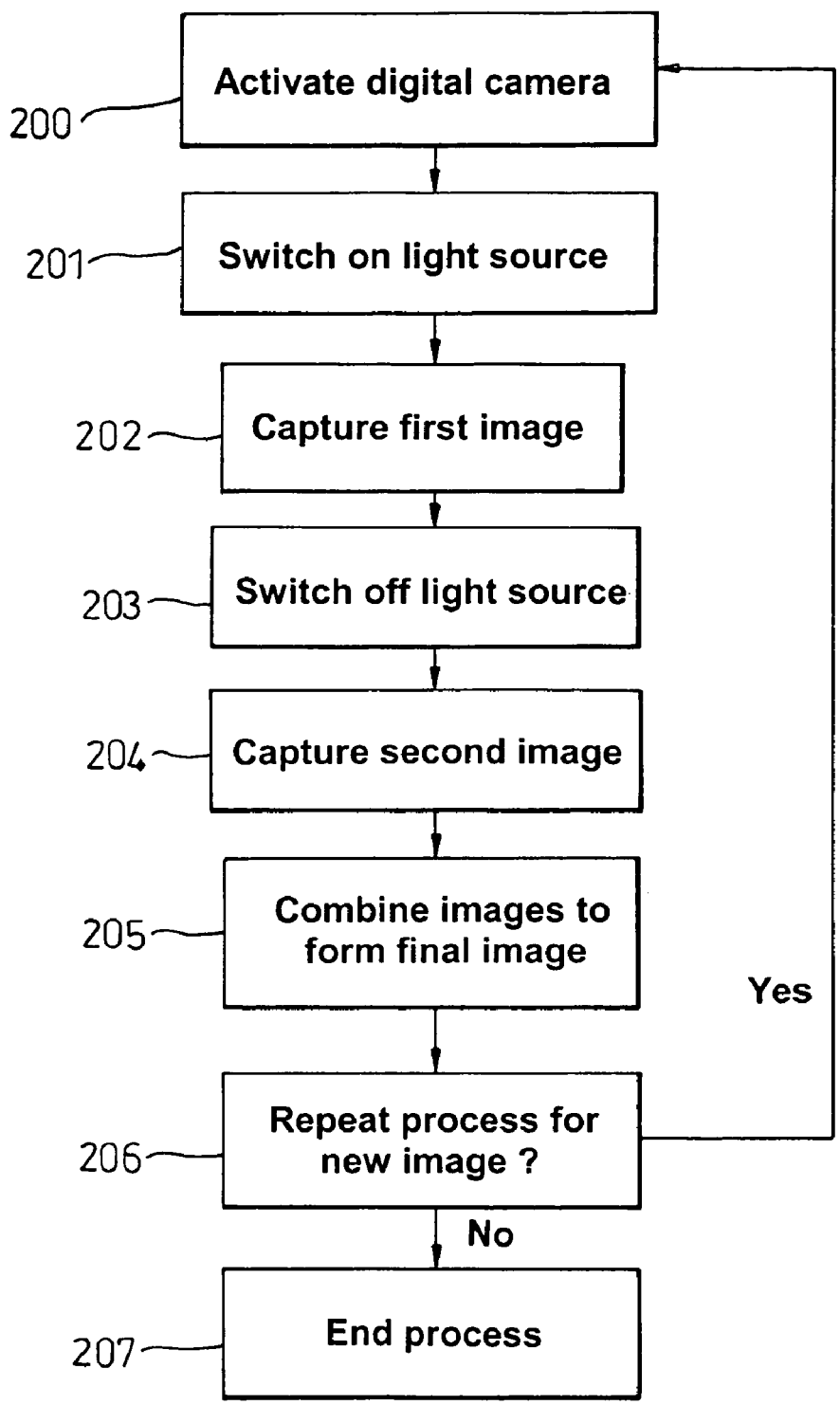
Figure 3:
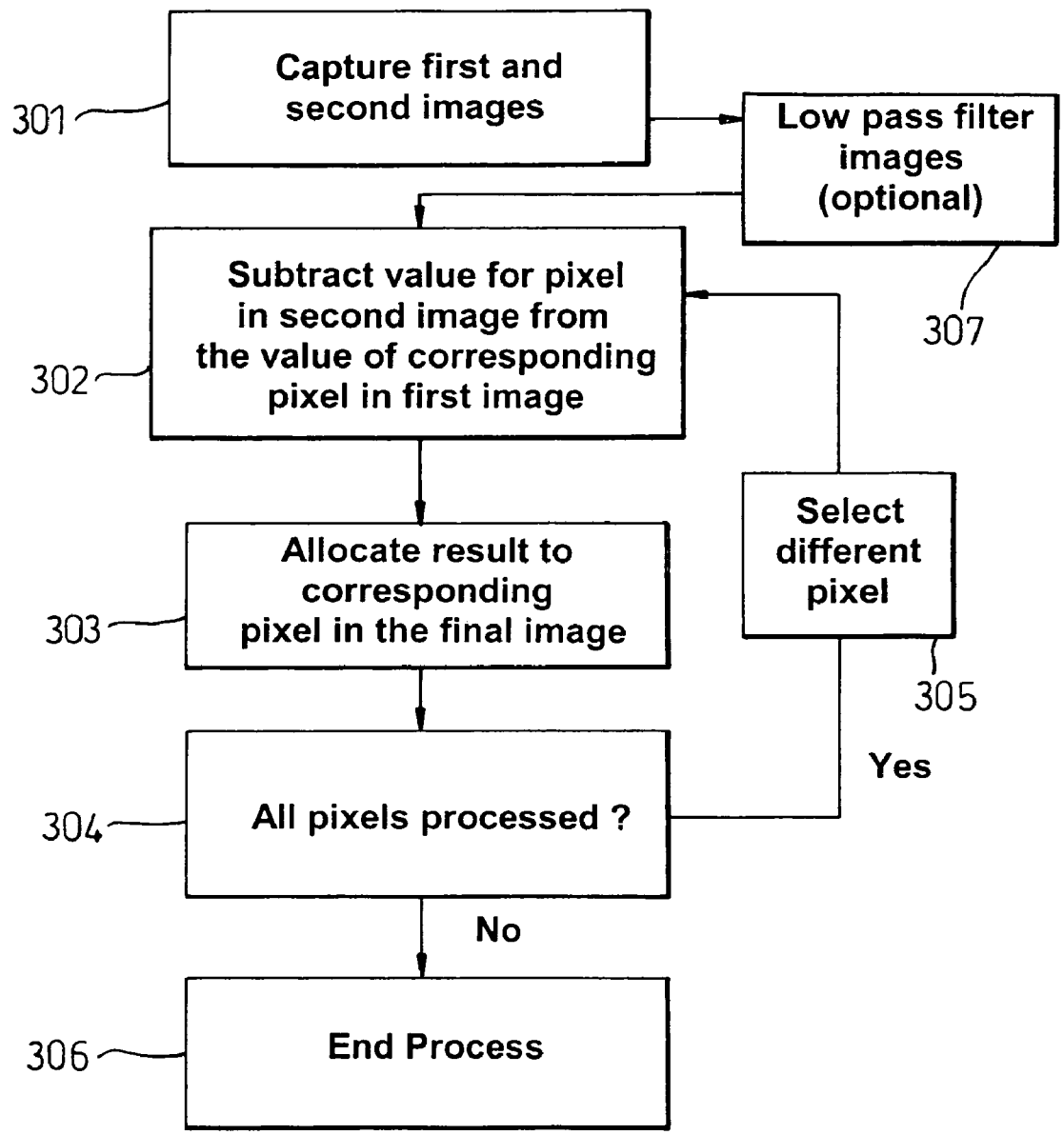
Figure 4:
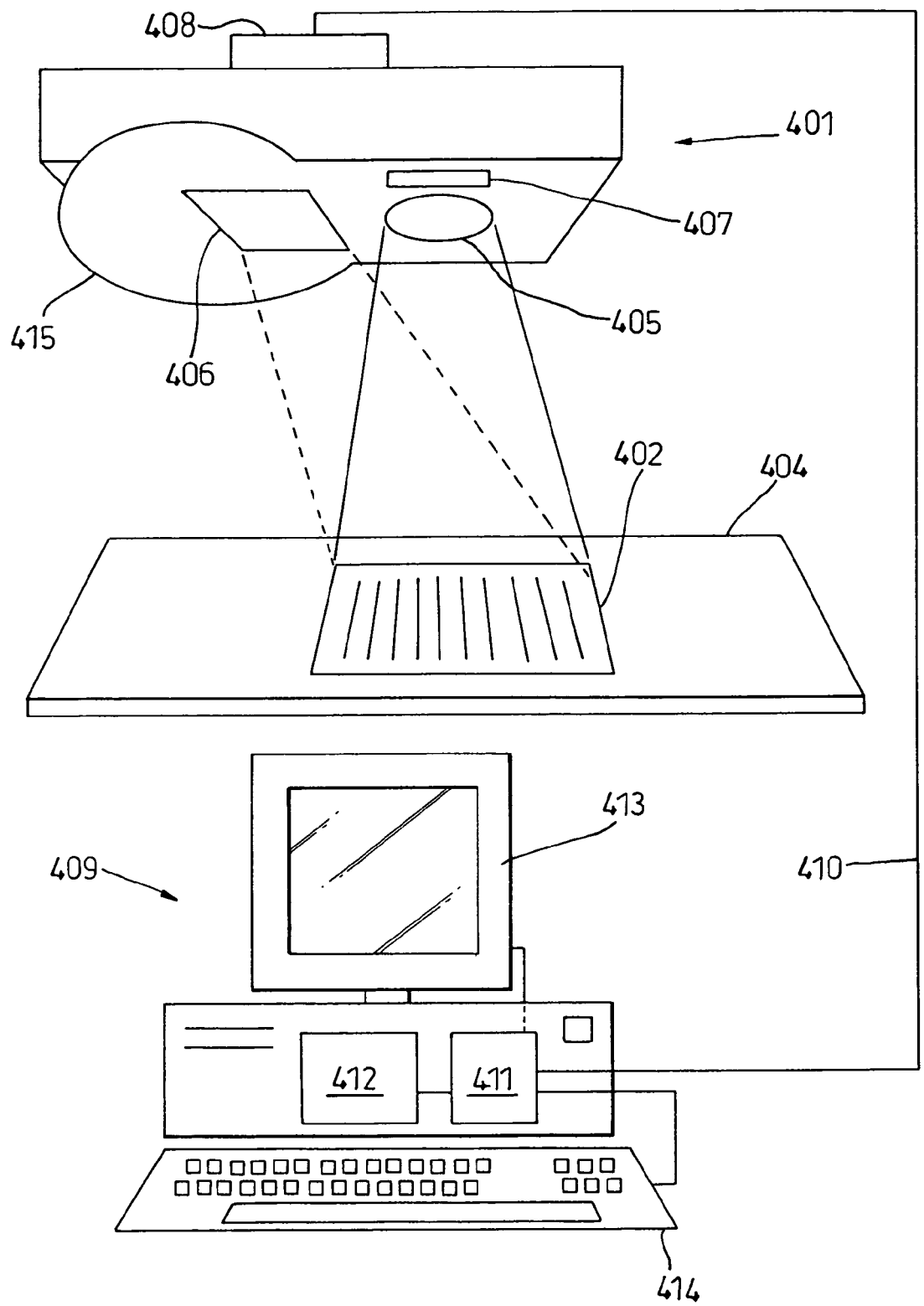
Figure 5:
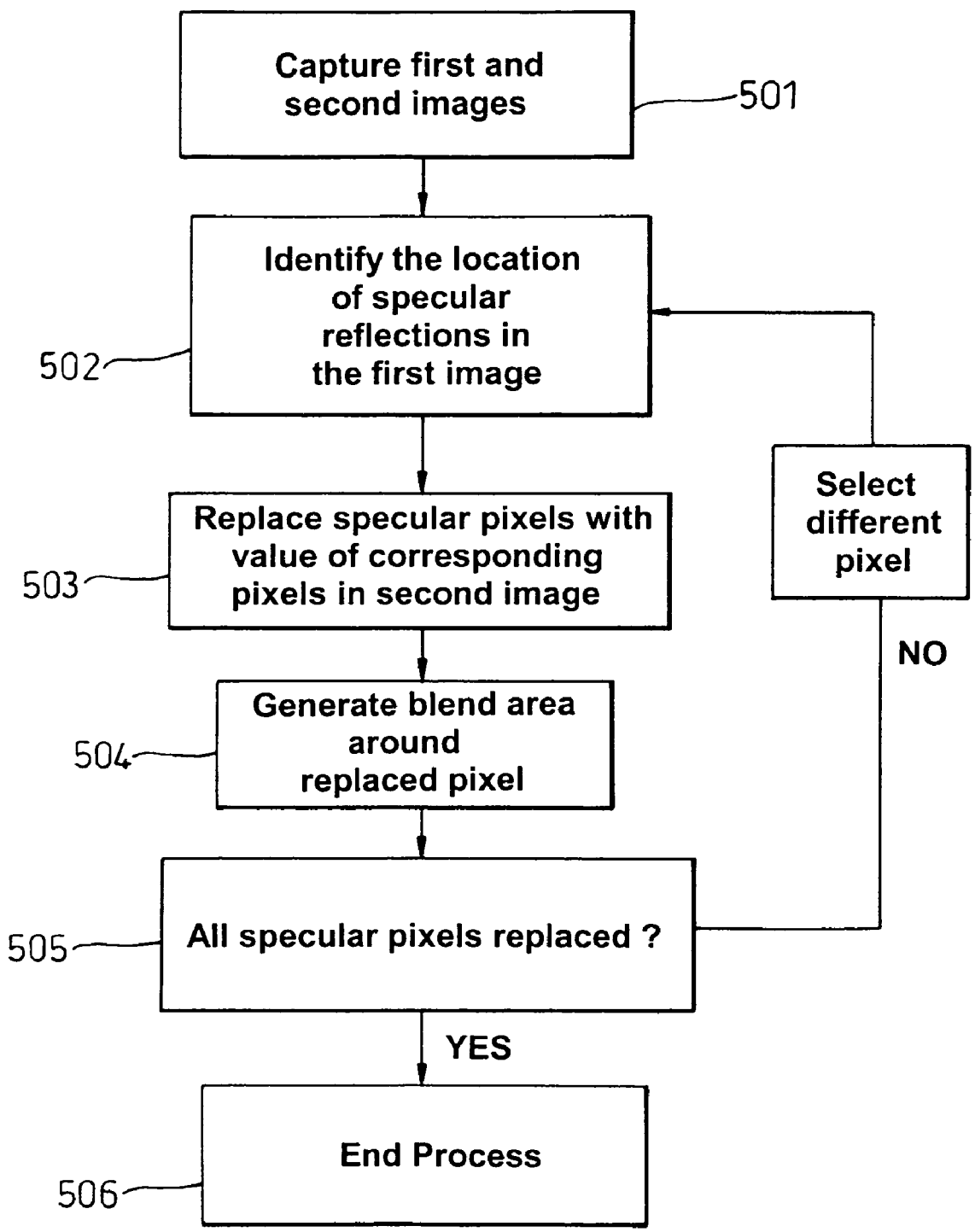
Figure 6:
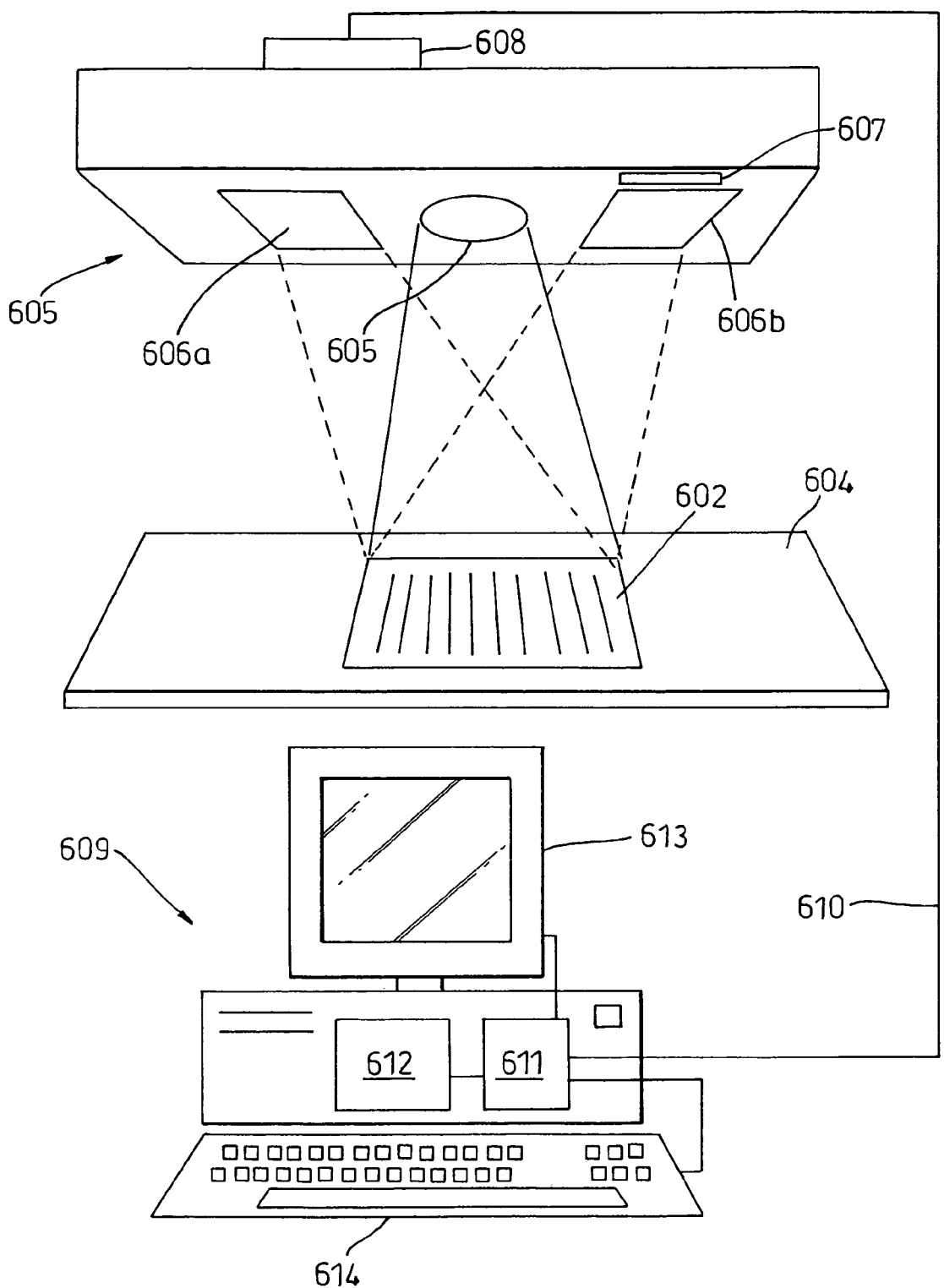

There will now be described, by way of example only, three embodiments of the present invention of which:

FIG. 1 is a schematic illustration of a first embodiment of a digital camera apparatus in accordance with the present invention;

FIG. 2 summarises the steps required to obtain a final image of a document from the digital camera apparatus of FIG. 1;

FIG. 3 summarises the steps required to process the captured images obtained from the apparatus of FIG. 1;

FIG. 4 is a schematic illustration of a second embodiment of a digital camera apparatus in accordance with the present invention;

FIG. 5 summarises the steps required to process the captured images obtained from the apparatus of FIG. 4; and FIG. 6 is a schematic illustration of a third embodiment of a digital camera apparatus in accordance with the present invention As illustrated in FIG. 1 of the accompanying drawings, a digital image capture apparatus in accordance with the invention comprises a digital camera 101 placed directly above a document 102. The camera is maintained in fixed position by a stand (not shown) vertically above the document, which is placed on a flat surface 104 such as an area of deskspace.

The digital camera comprises a lens 105 located on a lower face of the camera 101. Also positioned on the lower face of the camera-to one side of the lens, is a light source 106. The light source emits a controlled beam of light downwards towards the document 102 which is then reflected upwards from the document. The field of view of the lens 105 and the angle at which the light is emitted ensures that any specularly reflected light from the light source 106 is not collected by the lens.

The digital camera 101 further includes a detector 107 located behind the lens 105. This comprises an array of image collecting nodes which each produce an output signal when illuminated. The magnitude of the signal emitted by each node depends on the amount of light incident upon that node and also the wavelength (or wavelengths) of the light.

The digital camera 101 further includes a read-out circuit 108 which is adapted to produce a captured image corresponding to the output from each node in the array. This captured image comprises an array of data values which represents the image of the document that is directed onto the detector by the lens. The integration period of the read-out circuit also acts as an electronic shutter for the camera to control the exposure. Of course, a mechanical shutter may be provided if preferred. In fact, it is envisaged that the invention will offer increased benefits in applications which employ mechanical shutters as they are typically slower and so allow a greater build up of ambient light.

The camera read-out circuit 108 is connected to a computer 109 by an appropriate electrical cable 110. This cable 110 carries the captured image data to the remote computer 109 where it is stored in an area of memory 111. The cable 110 also carries control signals from the computer 109 to the camera. These signals turn the light source ON or OFF as required, and also control the read-out circuit to initiate the capture of an image.

The computer 109 includes a processor 112, a display 113 and an input means 114 such as a keyboard or mouse. The processor 112 is connected to the input means, the display and the memory by a communications bus (not shown) in a known manner and also to the memory 111 in which the captured images are stored.

In use of the apparatus, the document 102 is positioned below the camera 101 and operation is initiated by a user pressing a button on the keyboard or mouse 114. Upon receipt of the user input the processor 112 issues a sequence of control signals to the digital camera 101 along the cable 109 to complete the capture process as illustrated in FIG. 2 of the accompanying drawings.

After activating 200 the camera the processor initially issues a control signal 201 to the camera to activate the light source, the detector and the read-out circuit. The light source is switched ON and the processor issues a control signal to the read-out circuit to capture 202 a first image of the document. This image is downloaded to the computer 109 along the cable 110 and stored in the memory 111. The light source need not be constantly switched on during the image capture.

The processor 112 next issues a second control signal to the light source to turn it OFF 203 and issues a control signal to the read-out circuit to capture 204 a second image. The only source of illumination of the document is ambient light. Of course, the order of capture of the two images could be reversed without any effect. The second image is also downloaded to the processor and stored in the memory.

Having captured the two images the processor combines 205 the images to produce a final captured image which represents an electronic copy of the document placed below the camera.

The final image is stored in the memory and the user is prompted 206 to initiate capture of a different image or to end the capture process. The stored final image can be subsequently displayed or printed or subjected to additional processing if desired. If the user indicates that no more images are needed the camera is deactivated and the process ends 207.

The camera may capture the second image at the same exposure as the first image (i.e. using the same shutter speed and lens settings). In this case the contribution to both the first and the second images made by ambient light will be the same.

Where the first and second images are captured with the same exposure settings, the processing means may combine the two images in the manner illustrated in FIG. 3 of the accompanying drawings. After capturing 301 the two images at the same exposure, the processor subtracts 302 the value of each data point in the second image from the value of the corresponding data point in the first image. The resulting value is allocated 303 to the corresponding data point in the final image. This is repeated 304 choosing different pixels 305 until all data points have been processed 306 (i.e. all pixels in the final image have been determined). The final image is then free to the effects of ambient light.

In an optional step, the captured images may be passed through a low pass filter 307 prior to combining. This reduces the amount of noise present in the images.

An alternative arrangement is illustrated in FIG. 4 of the accompanying drawings. This differs from FIG. 1 only in so far as the light source is within the field of view of the lens, and in that the processor combines the images in a different way. For clarity, the same reference numerals as used for FIG. 1 have been used but incremented by 300. An optional shield 415 is also shown around the light source which prevents specular reflections due to ambient light occupying the same region of the first image as the specular reflections due to the light source.

In this arrangement, the second image may be captured at a longer exposure than the first image so that both captured images are fully exposed. Obviously, a longer exposure is required for the second image since the amount of light reflecting from the document in the second image is less than the first image. By fully exposed we mean neither under or over exposed.

In this case, the processor may combine the two images in the manner indicated in FIG. 5 of the accompanying drawings, After capturing 501 two images which are correctly exposed (i.e. neither under nor over exposed), the processor identifies 502 pixels in the first or the second image which correspond to specular reflected light from either the controlled light source or the ambient source. This identification can be performed simply by looking for bright spots in the images (which may even be saturated in many cases).

Having identified the bright spots the final image is constructed 503 by combining the two images such that any pixels identified as glare spots in the first image are replaced by corresponding pixels in the second image.

The replacement or pasting of pixels is continued for the whole image until all the specular areas have been replaced. The pixels around the saturated points may also be blended 505 together to provide a smooth transition from the original areas to the replaced areas. Once all have been replaced 505 the process is ended 506 and the final image stored in the memory 111.

Several refinements can be applied in this case. Firstly, a third image obtained using only ambient light and at the same exposure as the first image can be captured. This image is then processed with the first image as set out in FIG. 2 prior to replacing the specular pixels in the (processed) first image with data values from the second image.

Secondly, the processor may compare the data in the first image and the second image to construct a map or transform which compensates for differences in colour temperature between the ambient light and the controlled light source. This colour transform can be calculated for regions of the image where pixels do not need to be replaced. Whenever a pixel is replaced in the first image the new pixel taken from the correctly exposed ambient image is passed through the colour transform before it is pasted into the final image.

Furthermore, a transform may also be used to ensure that any misalignment between the images is removed prior to pasting in the replacement pixels. This is achieved by identifying the location of features in each image and mapping the features in the second image onto the features of the first image.

A third embodiment of the present invention is illustrated in FIG. 6 of the accompanying drawings. This differs from FIG. 1 only in so far as the two identical light sources 606a and 606b are provided within the field of view of the lens. For clarity, the same reference numerals as used for FIG. 1 have been used but incremented by 500.

In this embodiment, the read-out circuit captures a first image of the document illuminated by the first light source and a second image captured when the document is illuminated by the second light source. An additional ambient image is also captured in which the first and second light sources are extinguished so that the only source of illumination is the ambient light. Notably, the exposure times of the first and second images are chosen so that the images are fully exposed. The ambient image is captured with the same exposure as the first two images (and is consequently underexposed).

As with the first embodiment, the ambient image is subtracted from each of the first and second captured images to produce respective first and second processed captured images. The effect of ambient light will have been removed from these processed images.

Subsequently, points of glare in the first image are identified and are replaced by corresponding data values taken from the second processed image to form the final image.

Of course, if the two light sources are not identical (i.e. illuminate the document at different intensities) the exposure required for each of the first and second images will be different. In that case, two ambient images may be captured. A first one should be taken at the same exposure as the first captured image and the second at the same exposure as the second captured image.

The invention claimed is:

1. A digital image capture apparatus configured to capture an image of a document at least partially illuminated by ambient light, the apparatus comprising:
    a digital camera positioned vertically above said document, said digital camera comprising:
        a lens;
        a detector element located proximate to said lens, wherein said detector element comprises an array of image collecting nodes which each produce an output signal;
        an illumination source for illuminating said document, wherein said illumination source is positioned proximate to said lens and is configured to emit a controlled beam of light at an angle in a direction of said document; and
        a detector read-out circuit, wherein said detector read-out circuit is configured to produce a captured image corresponding to said output signals received from said image collecting nodes, and
    a computing device electronically coupled to the digital camera, said computing device comprising:
        a controller configured to control said detector read-out circuit and said illumination source, wherein said controller is configured to provide a first control signal to said detector read-out circuit to capture a first image of said document when illuminated by said illumination source at a first intensity and by said ambient light to produce said first image, and wherein said controller is further configured to provide a second control signal to said detector read-out circuit to capture a second image of said document when said document is illuminated by said illumination source at a second, lower, intensity and by said ambient light, said second, lower, intensity having a value greater than or equal to zero intensity but less than the first intensity; and
        a processor configured to process said first image with said second image to produce a final image of said document, wherein said processor is configured to process said first image with said second image to produce said final image by subtracting a value at each data point in said second captured image from a value at each corresponding data point in said first captured image to arrive at a final value for each data point, wherein said processor is configured to allocate said final value for each data point to a corresponding data point in said final image.

2. Apparatus according to claim 1 wherein said first image and said second image are captured with substantially a same exposure.

3. Apparatus according to claim 2 wherein said processor includes a low pass filter, and wherein at least one of said captured images is passed through said low pass filter prior to subtraction.

4. Apparatus according to claim 3 wherein only said second captured image is low-pass filtered.

5. A method of capturing an image of a document at least partially illuminated by ambient light, said method comprising
    capturing a first image of said document with a light source illuminating said document at a first intensity, wherein said light source is part of a digital camera positioned vertically above said document, wherein said light source is positioned proximate to a lens and is configured to emit a controlled beam of light at an angle in a direction of said document;
    capturing a second image of said document with said light source illuminating said document at a second, lower, intensity, wherein said first image and said second image are captured using identical exposures; and
    processing, at a computing device electronically coupled with the digital camera, said first captured image with said second captured image to produce a final image of said document, wherein said second lower intensity is greater than or equal to zero intensity but less than said first intensity,
        wherein said processing said first captured image with said second captured image to produce a final image comprises:
            subtracting a value at each data point in said second captured image from a value at each corresponding data point in said first captured image to arrive at a final value for each data point; and
            allocating said final value for each data point to a corresponding data point in said final image.

6. A digital image capture apparatus configured to capture an image of an object at least partially illuminated by ambient light, the apparatus comprising:
    a digital camera positioned vertically above said object, said digital camera comprising:
        a lens;
        a detector element located proximate to said lens, wherein said detector element comprises an array of image collecting nodes which each produce an output signal;
        an illumination source for illuminating said object wherein said illumination source is positioned proximate to said lens and is configured to emit a controlled beam of light at an angle in a direction of said object; and
        a detector read-out circuit, wherein said detector read-out circuit is configured to produce a captured image corresponding to said output signals received from said image collecting nodes, and
    a computing device electronically coupled to the digital camera, said computing device comprising:
        a controller configured to control said detector read-out circuit and said illumination source, wherein said controller is configured to provide a first control signal to said detector read-out circuit to capture a first image of said object when illuminated by said illumination source at a first intensity and by said ambient light to produce said first image, and wherein said controller is further configured to provide a second control signal to said detector read-out circuit to capture a second image of said object when said object is illuminated by said illumination source at a second, lower, intensity and by said ambient light, said second, lower, intensity having a value greater than or equal to zero intensity but less than the first intensity; and
        a processor configured to process said first image with said second image to produce a final image of said object, wherein said processor is configured to process said first image with said second image to produce said final image by subtracting a value at each data point in said second captured image from a value at each corresponding data point in said first captured image to arrive at a final value for each data point, wherein said processor is configured to allocate said final value for each data point to a corresponding data point in said final image.

7. A digital image capture apparatus configured to capture an image of a document at least partially illuminated by ambient light, the apparatus comprising:
   a digital camera positioned vertically above said document, said digital camera comprising:
   a lens
   a detector element located proximate to said lens, wherein said detector element comprises an array of image collecting nodes which each produce an output signal;
   an illumination source for illuminating said document, wherein said illumination source is positioned proximate to said lens and is configured to emit a controlled beam of light at an angle in a direction of said document; and
   a detector read-out circuit, wherein said detector read-out circuit is configured to produce a captured image corresponding to said output signals received from said image collecting nodes, and
   a computing device electronically coupled to the digital camera, said computing device comprising:
   a controller configured to control the detector read-out circuit and the illumination source so as to capture a plurality of images at different levels of illumination;
   a processor configured to process the plurality of images and produce a final image based thereon, wherein said processor is configured to process said plurality of images to produce said final image by subtracting a value at each data point in a second image comprising only ambient light from a value at each corresponding data point in a first image comprising ambient light and light from the illumination source to arrive at a final value for each data point, wherein said processor is configured to allocate said final value for each data point to a corresponding data point in said final image.

8. A digital image capture apparatus of claim 7, wherein said illumination source is arranged in a predetermined spatial relationship with said digital camera.

9. A digital image capture apparatus of claim 7, wherein said first image and said second image are captured with substantially a same exposure.

10. A digital image capture apparatus configured to capture an image of a object at least partially illuminated by ambient light, the apparatus comprising:
   a digital camera positioned vertically above said object, said digital camera comprising:
   a lens
   a detector element located proximate to said lens, wherein said detector element comprises an array of image collecting nodes which each produce an output signal;
   an illumination source for illuminating said object, wherein said illumination source is positioned proximate to said lens and is configured to emit a controlled beam of light at an angle in a direction of said object; and
   a detector read-out circuit, wherein said detector read-out circuit is configured to produce a captured image corresponding to said output signals received from said image collecting nodes, and
   a computing device electronically coupled to the digital camera, said computing device comprising:
   a controller configured to control the detector read-out circuit and the illumination source so as to capture a plurality of images at different levels of illumination;
   a processor configured to process the plurality of images and produce a final image based thereon, wherein said processor is configured to process said plurality of images to produce said final image by subtracting a value at each data point in a second image comprising only ambient light from a value at each corresponding data point in a first image comprising ambient light and light from the illumination source to arrive at a final value for each data point, wherein said processor is configured to allocate said final value for each data point to a corresponding data point in said final image.

11. A digital image capture apparatus of claim 10, wherein said first image and said second image are captured with substantially a same exposure.

* * * * *

UNITED STATES PATENT AND TRADEMARK OFFICE
CERTIFICATE OF CORRECTION

PATENT NO.        : 7,619,664 B2                        Page 1 of 1
APPLICATION NO.   : 11/248156
DATED             : November 17, 2009
INVENTOR(S)       : Stephen B. Pollard et al.

It is certified that error appears in the above-identified patent and that said Letters Patent is hereby corrected as shown below:

In column 10, lines 2-3, in Claim 5, delete "comprising" and insert -- comprising: --, therefor.

In column 10, line 40, in Claim 6, after "object" insert -- , --.

In column 11, line 15, in Claim 7, after "lens" insert -- ; --.

In column 12, line 12, in Claim 10, after "lens" insert -- ; --.

Signed and Sealed this

Sixth Day of April, 2010

David J. Kappos
*Director of the United States Patent and Trademark Office*